United States Patent
Murakami (10) Patent No.: US 10,437,413 B2
(45) Date of Patent: Oct. 8, 2019

(54) MULTI-SCREEN CURSOR CONTROL DISPLAY SYSTEM

(71) Applicant: TOYOTA JIDOSHA KABUSHIKI KAISHA, Toyota-shi, Aichi-ken (JP)

(72) Inventor: Kunihiro Murakami, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 44 days.

(21) Appl. No.: 15/793,629

(22) Filed: Oct. 25, 2017

(65) Prior Publication Data

US 2018/0150135 A1 May 31, 2018

(30) Foreign Application Priority Data

Nov. 25, 2016 (JP) ................. 2016-229531

(51) Int. Cl.
*G06F 3/0481* (2013.01)
*G06F 3/041* (2006.01)
(Continued)

(52) U.S. Cl.
CPC ........ *G06F 3/04812* (2013.01); *G06F 3/0416* (2013.01); *G06F 3/0482* (2013.01); *G06F 3/0488* (2013.01); *G06F 3/04886* (2013.01); *B60K 2370/146* (2019.05); *B60K 2370/52* (2019.05); *G06F 3/013* (2013.01); *G06F 2203/04803* (2013.01); *H04N 5/44591* (2013.01)

(58) Field of Classification Search
CPC .. G06F 3/013; G06F 3/04886; G06F 3/04812; G06F 3/0488; G06F 3/0416; G06F 3/0482; G06F 2203/04803; B60K 2350/352; B60K 2350/1052; H04N 5/44591; H04N 5/45; H04N 2005/44595
See application file for complete search history.

(56) References Cited

U.S. PATENT DOCUMENTS 6,121,900 A * 9/2000 Takishita ............. G01C 21/367
                                                  340/990
6,493,008 B1 * 12/2002 Yui .......................... G09G 5/08
                                                  348/E5.104

(Continued)

FOREIGN PATENT DOCUMENTS

JP    2000-305543 A    11/2000
JP    2011-059440 A    3/2011
WO    2013/088559 A1   6/2013

*Primary Examiner* — Darlene M Ritchie
(74) *Attorney, Agent, or Firm* — Oliff PLC (57) ABSTRACT

A display system includes; a display, an operation device and a plurality of ECUs including a first ECU and a second ECU. The first ECU is configured to use first setting information in which a control form of a cursor on a screen output from the first ECU is set and second setting information in which a control form of the cursor on a screen output from the second ECU is set. While the first ECU is outputting the screen, the first ECU is configured to control display of the cursor based on the operation information output from the operation device and the first setting information, and while the second ECU is outputting the screen, the first ECU is configured to control the display of the cursor based on the operation information output from the operation device and the second setting information.

8 Claims, 5 Drawing Sheets

(51) Int. Cl.
*G06F 3/0488* (2013.01)
*G06F 3/0482* (2013.01)
*H04N 5/445* (2011.01)
*G06F 3/01* (2006.01)

(56) References Cited

U.S. PATENT DOCUMENTS

| | | | |
|---|---|---|---|
| 9,293,116 B2* | 3/2016 | Chikahisa | G01C 21/3664 |
| 2007/0222774 A1* | 9/2007 | Foster | G06F 3/1431 |
| | | | 345/204 |
| 2007/0285364 A1* | 12/2007 | Nakagawa | H04N 5/44591 |
| | | | 345/87 |
| 2008/0074389 A1* | 3/2008 | Beale | G06F 3/013 |
| | | | 345/161 |
| 2011/0261201 A1* | 10/2011 | Fujii | B60R 1/00 |
| | | | 348/148 |
| 2012/0011445 A1* | 1/2012 | Gilboa | G06F 3/0481 |
| | | | 715/740 |
| 2012/0287042 A1* | 11/2012 | Chen | G06F 3/023 |
| | | | 345/157 |
| 2014/0009394 A1* | 1/2014 | Lee | H04N 5/4403 |
| | | | 345/157 |
| 2015/0009177 A1* | 1/2015 | Yamamoto | G06F 3/0414 |
| | | | 345/174 |
| 2015/0082241 A1* | 3/2015 | Kang | G06F 3/04845 |
| | | | 715/803 |
| 2015/0205524 A1* | 7/2015 | Fuke | G06F 3/03543 |
| | | | 345/163 |
| 2015/0220242 A1* | 8/2015 | Guest | G06F 3/0354 |
| | | | 715/740 |
| 2017/0277548 A1* | 9/2017 | Hagiwara | G06F 3/14 |
| 2018/0091758 A1* | 3/2018 | Lee | G06F 3/14 |

* cited by examiner

MULTI-SCREEN CURSOR CONTROL DISPLAY SYSTEM

INCORPORATION BY REFERENCE

The disclosure of Japanese Patent Application No. 2016-229531 filed on Nov. 25, 2016 including the specification, drawings and abstract is incorporated herein by reference in its entirety.

BACKGROUND

1. Technical Field

The present disclosure relates to a display system in which control devices output screens individually.

2. Description of Related Art

An information processing apparatus that controls display of a cursor on a screen by operating a touch pad is known. In selection control that is an example of control performed by the information processing apparatus, when a touch of a finger on an operation surface of the touch pad is detected, a selection item that is associated with the touched position is determined as a display position of the cursor. At this time, the display position of the cursor may be determined in such a form that pull-in force is applied to a selection item close to the touched position. In relative position control that is another example of control performed by the information processing apparatus, the display of the cursor is controlled based on a movement distance to a position on the operation surface touched with the finger, or the like, regardless of an absolute position on the operation surface of the touch pad touched with the finger (for example, see WO 2013/088559).

SUMMARY

In a display system in which control devices output screens to a display device individually, control for display of a cursor, such as a position of the cursor or motion of the cursor, is performed by the individual control device. Then, in a case where display of one cursor is controlled individually in a plurality of control devices, at the time of transition of a screen to be a target of an operation, an event that the cursor is not displayed instantaneously, an event that a plurality of cursors is displayed instantaneously, or the like occurs, and there is a possibility that a user receives an impression different from an operation with respect to the display of the cursor.

The disclosure provides a display system in which control devices output screens individually, having an advantage of suppressing a sense of discomfort on the display of a cursor.

An aspect of the disclosure relates to a display system including a display device, an operation device, and a plurality of electronic control units. The display device is configured to display a screen. The operation device is configured to output operation information that is information relating to an operation of a cursor. The electronic control units are connected to a communication network. The electronic control units are configured to individually output screens that are displayed on the display device. The electronic control units include a first electronic control unit and a second electronic control unit. The first electronic control unit is configured to use first setting information in which a control form of a cursor on a screen output from the first electronic control unit is set and second setting information in which a control form of the cursor on a screen output from the second electronic control unit is set, and the first electronic control unit is configured to control display of the cursor based on the operation information output from the operation device and the first setting information while the first electronic control unit is outputting the screen, and the first electronic control unit is configured to control the display of the cursor based on the operation information output from the operation device and the second setting information while the second electronic control unit is outputting the screen.

According to the aspect of the disclosure, while the first electronic control unit is outputting the screen and while the second electronic control unit is outputting the screen, the first electronic control unit controls the display of the cursor based on the operation information. At this time, the first electronic control unit performs the control of the cursor based on the setting information in which the control form of the cursor on each output screen is set. For this reason, it is possible to suppress a sense of discomfort on the display of the cursor due to transition of an output source of a screen.

In the display system according to the aspect of the disclosure, the second electronic control unit may be configured to, with change in the screen output from the second electronic control unit, transmit information, in which a control form of the cursor on a screen after change is set, as the second setting information to the first electronic control unit. The first electronic control unit may be configured to control the display of the cursor using the second setting information received from the second electronic control unit.

According to the aspect of the disclosure, even in a case where the control form of the cursor changes along with the screen output from the second electronic control unit, it is possible to control the display of the cursor with the control form of the cursor suitable for the screen after change.

In the display system according to the aspect of the disclosure, a single screen to be displayed on the display device may include both of the screen output from the first electronic control unit and the screen output from the second electronic control unit. In a situation in which a plurality of screens related to transition is displayed at a time, the user visually recognizes the above-described event and is likely to feel a sense of discomfort. According to the aspect of the disclosure, since a sense of discomfort is suppressed in such a situation, the above-described effect is obtained more remarkably.

In the display system according to the aspect of the disclosure, the second electronic control unit may be configured to output the screen to the display device through the first electronic control unit. The first electronic control unit may be configured to transmit a combined screen of the screen output from the second electronic control unit and the screen output from the first electronic control unit as the single screen to be displayed on the display device to the display device. The first electronic control unit may be configured to control the display of the cursor by specifying a relative position of the cursor with respect to the screen displayed on the display device based on the operation information and moving the cursor to the specified relative position.

According to the aspect of the disclosure, the first electronic control unit ascertains the single screen displayed on the display device, and the first electronic control unit performs processing for specifying the relative position of the cursor with respect to the single screen displayed on the display device and processing for moving the cursor to the specified relative position. For this reason, it is possible to further suppress a sense of discomfort on the movement of the cursor, such as movement of the cursor between screens, compared to a configuration in which the movement of the cursor is realized in an individual electronic control unit.

In the display system according to the aspect of the disclosure, the first electronic control unit may be configured to specify the type of operation based on the operation information and make the electronic control unit outputting the screen, on which the cursor is displayed, out of the first electronic control unit and the second electronic control unit execute display of the cursor corresponding to the specified type of operation.

According to the aspect of the disclosure, a function that makes the display of the cursor positioned at the relative position be displayed corresponding to the type of operation is realized by the electronic control unit outputting the screen, on which the cursor is displayed, out of the first electronic control unit and the second electronic control unit. For this reason, it is possible to distribute a load of executing the display corresponding to the type of operation to the electronic control units.

In the display system according to the aspect of the disclosure, the operation device may be a touch pad. The type of operation may include a tap, a double-tap, a flick, pinch-in, and pinch-out.

In the display system according to the aspect of the disclosure, the operation device may be a device that inputs information based on an operation using a touch panel. The type of operation may include a tap and a flick.

In the display system according to the aspect of the disclosure, the operation device may be a device that inputs information based on an operation using a mouse. The type of operation may include a click, a double-click, and a wheel operation.

In the display system according to the aspect of the disclosure, the operation device may be a device that inputs information based on an operation using a line of sight. The type of operation may include motion of the eyes, blinking, and the number of blinks.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
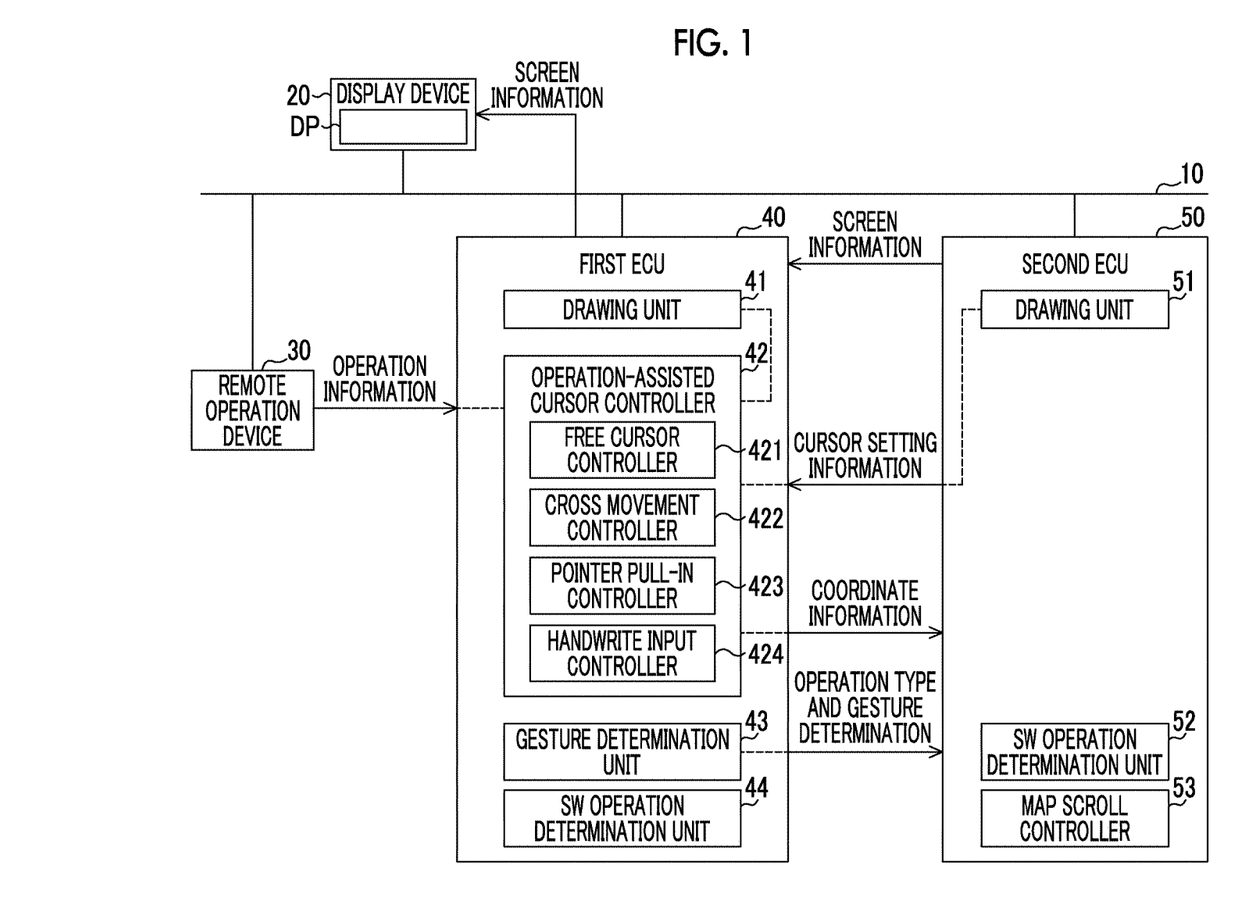
FIG. 1 is a block diagram showing the schematic configuration of an embodiment in which a display system is embodied.

An embodiment in which a display system is embodied will be described referring to FIG. 1. The display system of the embodiment includes a communication system that includes a communication network mounted in a vehicle (not shown).

First, the outline of the display system will be described referring to FIGS. 1 to 5. The communication system in the display system includes a first electronic control unit (ECU) 40 and a second electronic control unit (ECU) 50. The communication system includes a display device 20 that displays a screen including video in a display area of a display DP. The communication system also includes a remote operation device 30 that enables an operation of a driver or the like on display of the display device 20. The first ECU 40 and the second ECU 50 make the display DP display screens. The screens output from the first ECU 40 and the second ECU 50 are displayed in the display area of the display DP. A screen that is displayed on the display DP at a time includes the screen output from the first ECU 40 and the screen output from the second ECU 50.

The first ECU 40 directly outputs a screen drawn by the first ECU 40 to the display device 20. The second ECU 50 outputs a screen drawn by the second ECU 50 to the first ECU 40, and outputs the screen to the display device 20 through the first ECU 40. That is, the first ECU 40 ascertains the screen output from the first ECU 40 and the screen output from the second ECU 50.

The first ECU 40 inputs operation information that is output from the remote operation device 30 and relates to an operation of a cursor. The operation information input from the first ECU 40 relates to an operation of the cursor on the screen output from the first ECU 40 and an operation of the cursor on the screen output from the second ECU 50. Then, the first ECU 40 specifies an operation position (coordinate information) that is a position where an operation is performed and the type of operation based on the operation information input from the remote operation device 30. The first ECU 40 makes an ECU that outputs a screen to be a target of the operation ascertain the operation position (coordinate information) and the type of operation specified by the first ECU 40.

That is, in processing of an operation on a screen displayed on the display device 20, first, the operation position and the type of operation are specified in the first ECU 40, and the specified operation position and type of operation are used in the first ECU 40 and the second ECU 50.

Subsequently, the details of the display system will be described referring to FIG. 1. The communication system in the display system includes a communication bus 10 for an in-vehicle network. The display device 20, the remote operation device 30, the first ECU 40, and the second ECU 50 are communicably connected to the communication bus 10.

The display device 20 includes the display DP that displays a screen including video in the display area. The display device 20 displays the screen input from the first ECU 40 through the communication bus 10 on the display DP.

The remote operation device 30 includes a device that enables an operation of a driver or the like on the display of the display device 20, for example, a touch pad, and inputs information based on the operation of the driver or the like. The remote operation device 30 outputs information based on the operation of the cursor as the operation information to the communication bus 10. The first ECU 40 acquires the operation information output to the communication bus 10. The remote operation device 30 is physically separated from the display device 20.

The remote operation device 30 detects a position where an operation is performed on the touch pad, and the type of operation. The remote operation device 30 detects movement of an operation position on an operation surface of the touch pad. The first ECU 40 inputs the detected movement of the operation position and calculates a movement path. The movement path calculated by the first ECU 40 is used in a case of moving the position of the cursor displayed on the display device 20 based on the movement path.

The remote operation device 30 detects the type of operation performed on the touch pad. The detected type of operation is input to the first ECU 40. The type of operation is, for example, a tap, a double-tap, a flick, pinch-in, and pinch-out. In a case where a position on the screen of the cursor corresponding to the operation position is detected on the screen output from the first ECU 40, the first ECU 40 makes the type of operation correspond to the detected position and makes the display device 20 perform display corresponding to the type of operation. The first ECU 40 also gives notification of the operation position and the type of operation to a program that manages the operation position.

The first ECU 40 receives the operation information from the remote operation device 30 through the communication bus 10. The second ECU 50 receives the operation information from the first ECU 40 through the communication bus 10. The operation information includes the operation position and the type of operation transmitted from the remote operation device 30. The first ECU 40 and the second ECU 50 draw screens that the display device 20 displays. The first ECU 40 transmits the screen through the communication bus 10. The first ECU 40 and the second ECU 50 enable transmission and reception of various communication messages with each other through the communication bus 10. The first ECU 40 and the second ECU 50 enable transmission and reception of various communication messages with ECUs other than the two ECUs 40, 50.

The communication system employs, for example, a controller area network (CAN) protocol as a communication protocol. The communication system may include wireless communication in a part of a communication path, or may include a path that passes through another network by way of a gateway or the like.

In the CAN protocol, a frame that is a structure of a communication message is specified. The frame that is specified in the CAN protocol includes a storage area of a "message ID" as an identifier indicating the type of communication message, a "data field" that is a storage area of "message data" as data designated by a user, and the like. The "message ID" is determined to a specific value for each type of communication message. The first ECU 40 and the second ECU 50 give, to the communication messages transmitted from the first ECU 40 and the second ECU 50, the "message IDs" corresponding to the types of communication messages, transmit the communication messages, and determine the types of communication messages received by the first ECU 40 and the second ECU 50 based on the "message IDs". In the communication system, an ECU that can give the "message ID" to the communication message and transmit the communication message is one for each "message ID", and is unique to each "message ID". The data field that is an area where "message data" is stored has a length of 0 bits to 64 bits (0 bytes to 8 bytes).

Each of the first ECU 40 and the second ECU 50 includes a microcomputer having an arithmetic device (CPU) and a storage device. Each of the first ECU 40 and the second ECU 50 includes an arithmetic device that executes arithmetic operation processing of a program, a read only memory (ROM) that stores the program, data, and the like, and a volatile memory (RAM) that temporarily stores an arithmetic operation result of the arithmetic device. Each of the first ECU 40 and the second ECU 50 also includes a storage device, such as a backup memory that stores and retains a set value or an arithmetic operation value, and a flash memory that retains data. Each of the first ECU 40 and the second ECU 50 reads the program retained in the storage device on the arithmetic device and executes the read program to realize a predetermined function. Each of the first ECU 40 and the second ECU 50 further includes a storage unit that stores a large amount of data, such as images. The storage unit is configured to perform reading and writing of data from and to a drawing unit.

Each of the first ECU 40 and the second ECU 50 include a communication I/F for a CAN protocol, a plurality of messages boxes (MBOX) that temporarily stores the communication messages, and the like. Each of the first ECU 40 and the second ECU 50 performs transmission and reception of the communication messages through the communication I/F or the MBOX.

The first ECU 40 and the second ECU 50 includes drawing units 41, 51, and SW operation determination units 44, 52, respectively. The drawing units 41, 51 draw screens when the display by the ECUs including the drawing units 41, 51 is permitted. The screens that are drawn by the drawing units 41, 51 are areas allocated to the ECUs including the drawing units 41, 51, and are allocated to a part of the display area of the display device 20. The first ECU 40 determines the permission of the display by the first ECU 40 and the display by the second ECU 50.

The second ECU 50 outputs the screen drawn by the drawing unit 51 to the first ECU 40. The first ECU 40 outputs the screen drawn by the drawing unit 41 to the display device 20. At this time, the first ECU 40 combines the screen output from the first ECU 40 and the screen output from the second ECU 50 and transmits the screens as a single screen to the display device 20. The first ECU 40 ascertains areas that are displayed on the display device 20 for the screens output from the first ECU 40 and the screen output from the second ECU 50. That is, the first ECU 40 ascertains the screen corresponding to the operation position input from the remote operation device 30 and the operation position on the screen.

When an icon (SW) that is a partial area on a screen where the cursor can be focused is operated on the screen, each of the SW operation determination units 44, 52 outputs animation indicating a response according to the operation of the SW. The SW operation determination units 44, 52 are provided in the individual ECUs. Then, animation that corresponds to the type of operation and is specific to each ECU is output on the screen.

The first ECU 40 includes an operation-assisted cursor controller 42 that performs cursor control, and a gesture determination unit 43 that performs gesture determination. The operation-assisted cursor controller 42 makes the cursor be displayed in a predetermined form. The cursor indicates an operation position in the display area of the display DP. Information relating to the display of the cursor displayed on the display device 20 is included in the screen information and transferred.

The operation-assisted cursor controller 42 controls the movement of the cursor according to the relationship between the screen being displayed and the operation position. For example, the operation-assisted cursor controller 42 provides the same operation performance between the screens regardless of an ECU that makes the screen be displayed, thereby unifying a sense of operation (feeling) between the screens. The operation-assisted cursor controller 42 enables the movement of the cursor across the screens adjacent to each other on the screens displayed by the first ECU 40 and the second ECU 50 individually. That is, the operation-assisted cursor controller 42 enables the cursor control across the screens.

The operation-assisted cursor controller 42 includes a free cursor controller 421, a cross movement controller 422, a pointer pull-in controller 423, and a handwrite input controller 424.

The free cursor controller 421 controls the display of the cursor when an operation mode of the cursor is a free cursor mode. The free cursor controller 421 performs free cursor control. The free cursor control is control for moving the cursor, and makes the cursor indicate the operation position at an arbitrary position on the screen. In the free cursor control, a control condition of the cursor is the same at each position within the screen. Accordingly, in a case of the free cursor mode, the user can operate the cursor in a state in which there is no assistance in an operation target or a boundary portion or in a state in which there is no suppression.

The cross movement controller 422 controls the display of the cursor when the operation mode of the cursor is a cross movement mode. The cross movement controller 422 controls the position of the cursor such that a focus indicating an operation target surely abuts on an SW within the screen. In the cross movement mode, in a case where a movement direction of the cursor is one of up, down, right, and left, the cursor moves to the next SW set in each movement direction to the SW on which the focus abuts before the operation. In the embodiment, in a case where the cursor moves between two screens output from different ECUs, the cross movement controller 422 of the first ECU 40 specifies the position of the SW on which the focus abuts before the operation, and moves the focus to an SW that is closest to the specified position and is drawn on another screen as a movement destination.

The pointer pull-in controller 423 controls the display of the cursor when the operation mode of the cursor is a pointer pull-in mode. The pointer pull-in controller 423 controls the position of the cursor such that the cursor is pulled in the center of the SW in a case where the position of the cursor reaches near the SW. In the pointer pull-in mode, control is performed such that the cursor is pulled in the center of the SW in a case where the cursor comes near the SW on a screen in which there are a portion where an operation by a free cursor is possible in a screen displayed by the ECU, such as a map screen, and a portion where an operation by an SW is possible. Cursor pull-in to the SW on each screen is collectively performed by the first ECU. Detection of an operation, such as a tap, on the pulled-in cursor to the SW or drawing of animation or the like according to the tap is performed by each ECU that outputs the operated SW.

In a case where two different screens are displayed, the pointer pull-in controller 423 sets a movement barrier that is not exceeded in a case where an operation larger than a normal operation is not performed, between the screens. Specifically, when a central portion of the two screens is formed as a plane, a barrier corresponding to a wall or a hill is set in a peripheral portion of each screen, and is set such that movement is impossible in a case where a larger operation than movement on a plane is not performed, for example, such that reaction force is given. With this, the pointer pull-in controller 423 performs control such that the cursor on the screen does not move to another adjacent screen unintentionally.

The handwrite input controller 424 controls the display of the cursor when the operation mode of the cursor is a handwrite input mode for a handwrite character input. The handwrite input controller 424 converts a line drawn manually to a character corresponding to the line. In particular, the handwrite input controller 424 is provided in a product for a country where a handwrite input is needed.

The gesture determination unit 43 determines the type of touch pad operation. Specifically, the gesture determination unit 43 detects a tap, a double-tap, a flick, pinch-in, and pinch-out operated on the touch pad. For example, a tap is an operation to tap the touch pad lightly, a double-tap is an operation to tap the touch pad lightly twice, and a flick is an operation to flick the touch pad lightly. Pinch-in is an operation to pinch the touch pad with two fingers, and pinch-out is an operation to widen the touch pad with two fingers. For example, a function of specifying an operation target and executing the tap is allocated to the tap, and a function different from the tap is allocated to the double-tap or the flick. A function of reducing a screen is allocated to pinch-in, and a function of enlarging a screen is allocated to pinch-out. The gesture determination unit 43 determines the type of operation on the touch pad, and an operation corresponding to the determined type of operation is given to a program that makes a map or the like be displayed, that is, is performed to the map or the like.

In the embodiment, the gesture determination unit 43 is provided solely in the first ECU 40. Accordingly, the determination of a gesture by the gesture determination unit 43 is performed on all screens regardless of a difference in ECUs that output the screens. With this, since the determination of a gesture is made solely in the gesture determination unit 43 in a unified manner, a sense of operation (feeling) that the driver or the like feels for an operation can be unified between the screens. In a case where the determination of a gesture is performed in each ECU, there is a possibility that a sense of operation is different for each ECU. The gesture determination unit 43 is provided solely in the first ECU 40, whereby duplicate development relating to gesture determination is avoided.

The second ECU 50 transmits screen information including the screen to be output. The second ECU 50 includes a map scroll controller 53. The map scroll controller 53 is provided, for example, in an ECU that has a navigation function. The map scroll controller 53 is a part that realizes a fine operation, such as a map scroll. For example, the map scroll controller 53 realizes a scroll operation by a flick on a map screen.

The functions of the drawing units 41, 51, the operation-assisted cursor controller 42, the gesture determination unit 43, the SW operation determination units 44, 52, and the map scroll controller 53 are realized by arithmetic operation processing of the program in the first ECU 40 and the second ECU 50.

Figure 2A:
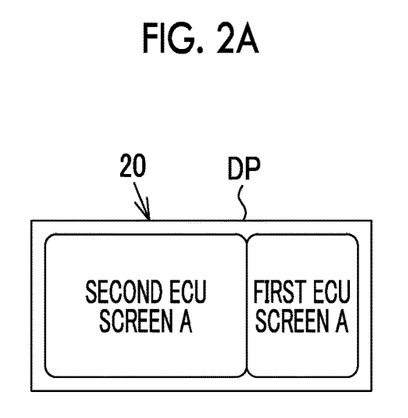
FIG. 2A is a diagram schematically showing an example of screen display by a display device, and is a diagram showing a state in which two screens are displayed.
Figure 2B:
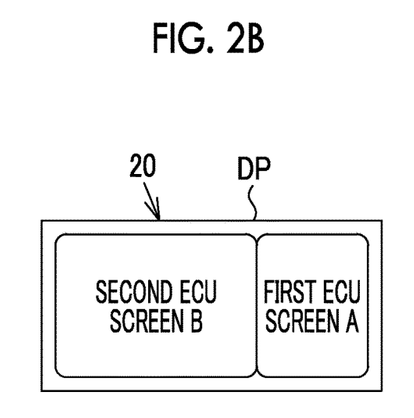
FIG. 2B is a diagram schematically showing an example of screen display by the display device, and is a diagram showing a state in which two screens are displayed.

An example of the cursor control in which the first ECU 40 and the second ECU 50 make the display device 20 display the screens will be described referring to FIGS. 2A, 2B, and 3. FIG. 2A shows a state in which a "screen A" output from the second ECU 50 is displayed in a portion equal to or greater than the left half in the display area of the display DP, and a "screen A" output from the first ECU 40 is displayed in a portion less than the right half in the display area of the display DP. FIG. 2B shows a state in which a "screen B" output from the second ECU 50 is displayed in a portion equal to or greater than the left half in the display area of the display DP, and a "screen A" output from the first ECU 40 is displayed in a portion less than the right half in the display area of the display DP like FIG. 2A. That is, in both cases, the two screens including the screen output from the second ECU 50 and the screen output from the first ECU 40 are displayed on the display device 20.

An operation example of the cursor will be described referring to FIG. 3 with FIGS. 2A and 2B as an example. Here, operation in a case where the screen that is displayed on the display device 20 transitions from FIG. 2A to FIG. 2B, and thereafter, an operation on the screen output from the second ECU 50 is performed will be described.

Figure 3:
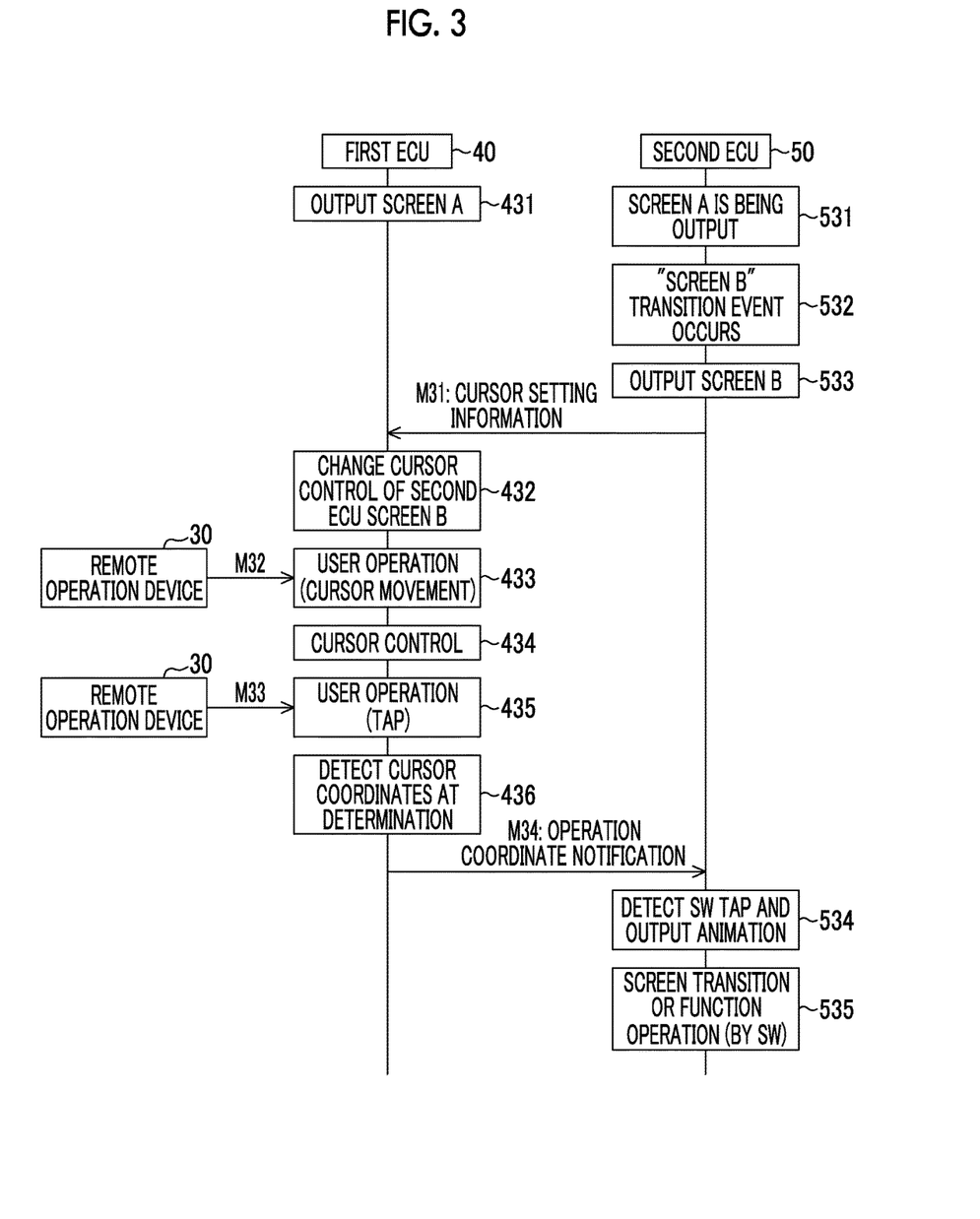
FIG. 3 is a sequence diagram showing an example of cursor control in the example.

As shown in FIG. 3, first, the first ECU 40 makes the "screen A" be displayed in a right portion in the display area of the display DP (Step 431). The second ECU 50 is outputting the "screen A" in a left portion in the display area of the display DP (Step 531). The "screen A" by the second ECU 50 is displayed on the display device 20 through the first ECU 40. Then, a transition event to the "screen B" occurs in the second ECU 50 (Step 532). The second ECU 50 outputs the "screen B" to be a target of an operation with the occurrence of the event (Step 533). The "screen B" is displayed on the display device 20 through the first ECU 40. The second ECU 50 gives notification M31 including cursor setting information on the "screen B" output from the second ECU 50 to the first ECU 40. The cursor setting information that is notified to the first ECU 40 by the second ECU 50 is an example of second setting information.

The cursor setting information is information that sets how the cursor is displayed at each position on the screen and what kind of function the cursor exhibits. For example, the cursor setting information includes five pieces of information including cursor classification, cursor display state, touch pad control form, SW information within the screen, and next SW information in the up, down, right, and left directions of the SW. In cursor classification, the shape of the cursor, such as a cross shape, a rectangular shape, or a circular shape, is set. In cursor display state, a display state, such as non-display or display, is set. In touch pad control form, no control, cross movement control, pointer pull-in, free cursor control, or handwrite input control is set. In SW information within the screen, relative coordinates and an area of the SW in the screen, and an ID of the SW as an identification code of the SW are set. In next SW information in the up, down, right, and left directions of the SW, SW information of other SWs to be a movement destination in the directions in the cross movement control is set. The first ECU 40 stores information that, even for the "screen A" output from the first ECU 40, sets how the cursor is displayed at each position on the screen and what kinds of function the cursor exhibits. The information that is stored in the first ECU 40 is an example of first setting information.

The first ECU 40 receives the notification M31 including the cursor setting information, and changes the cursor control to the area where the "screen B" displayed by the second ECU 50 is displayed, in conformity with the notification M31 (Step 432).

Thereafter, operation information M32 is input from the remote operation device 30 to the first ECU 40, and the first ECU 40 detects that a user operation is cursor movement from the input operation information (Step 433). The first ECU 40 changes cursor information that is transferred to the display device 20, based on information of the detected cursor movement, and accordingly, performs the cursor control (Step 434). Then, the position of the cursor that is displayed on the display device 20 is changed.

Subsequently, operation information M33 is input from the remote operation device 30 to the first ECU 40, and the first ECU 40 detects that the user operation is a "tap" from the input operation information M33 (Step 435). That is, the type of operation is detected as the "tap". The first ECU 40 detects coordinates on the "screen B" of the second ECU 50 as cursor coordinates at the time of tap operation determination from cursor coordinates when the tap is made (Step 436). At this time, the first ECU 40 detects the cursor coordinates in a coordinate system of the "screen B". Then, the first ECU 40 gives operation coordinate notification M34 including operation coordinates and the type of operation to the second ECU 50.

The second ECU 50 receives the operation coordinate notification M34 and acquires the operation coordinates and the type of operation. With this, the second ECU 50 detects that the SW is tapped, and outputs animation corresponding to the SW being tapped as screen information to the first ECU 40 (Step 534). With this, the display device 20 displays animation corresponding to the tap output from the second ECU 50 similarly on the "screen B" output from the second ECU 50.

The second ECU 50 gives notification of the operation coordinates and the type of operation acquired by the second ECU 50 to a program that manages screen display, thereby performing "screen transition" or "function operation" that is operation corresponding to the operation (Step 535).

With this, the user operation performed on the screen output from the second ECU 50 with the remote operation device 30 can be processed in the first ECU 40 and notified to the second ECU 50, and the second ECU 50 can perform appropriate processing on the notification.

When the first ECU 40 is outputting the screen, the first ECU 40 displays animation corresponding to the tap on the "screen A" output from the first ECU 40 based on the cursor coordinates when the tap is made being on the "screen A" of the first ECU 40.

Another example of a case where the first ECU 40 and the second ECU 50 make the display device 20 display the screens, a combination of the displayed two screens is different, and cursor control or the like is performed will be described referring to FIGS. 4A, 4B, and 5.

Figure 4A:
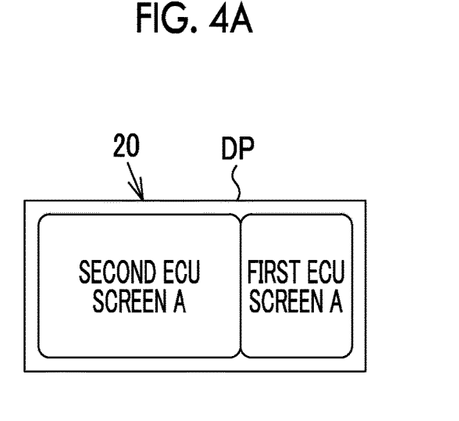
FIG. 4A is a diagram schematically showing another example of screen display by the display device, and is a diagram showing a state in which two screens are displayed.
Figure 4B:
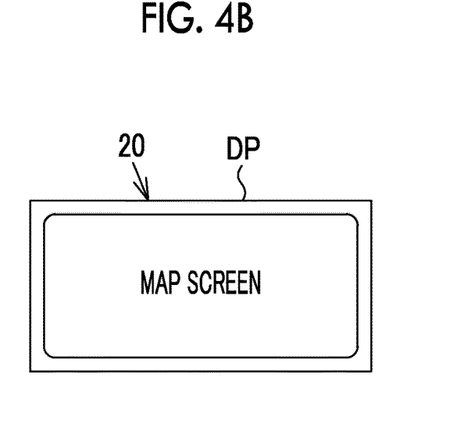
FIG. 4B is a diagram schematically showing another example of screen display by the display device, and is a diagram showing a state in which one screen is displayed.

FIG. 4A shows a state in which a "screen A" by the second ECU 50 is displayed in a portion equal to or greater than the left half in the display area of the display DP, and a "screen A" by the first ECU 40 is displayed in a portion less than the right half in the display area of the display DP. FIG. 4B shows a state in which a "map screen" by the second ECU 50 is displayed in the entire display area of the display DP. That is, a case where the screens output from the first ECU 40 and the second ECU 50 are displayed on the display DP of the display device 20, and a case where solely the screen output from the second ECU 50 is displayed are shown.

An operation example of the cursor will be described referring to FIG. 5 with FIGS. 4A and 4B as an example. Here, operation in a case where the screen that is displayed on the display device 20 changes from FIG. 4A to FIG. 4B, and an operation is performed on the map screen displayed by the second ECU 50 as the display after change will be described.

Figure 5:
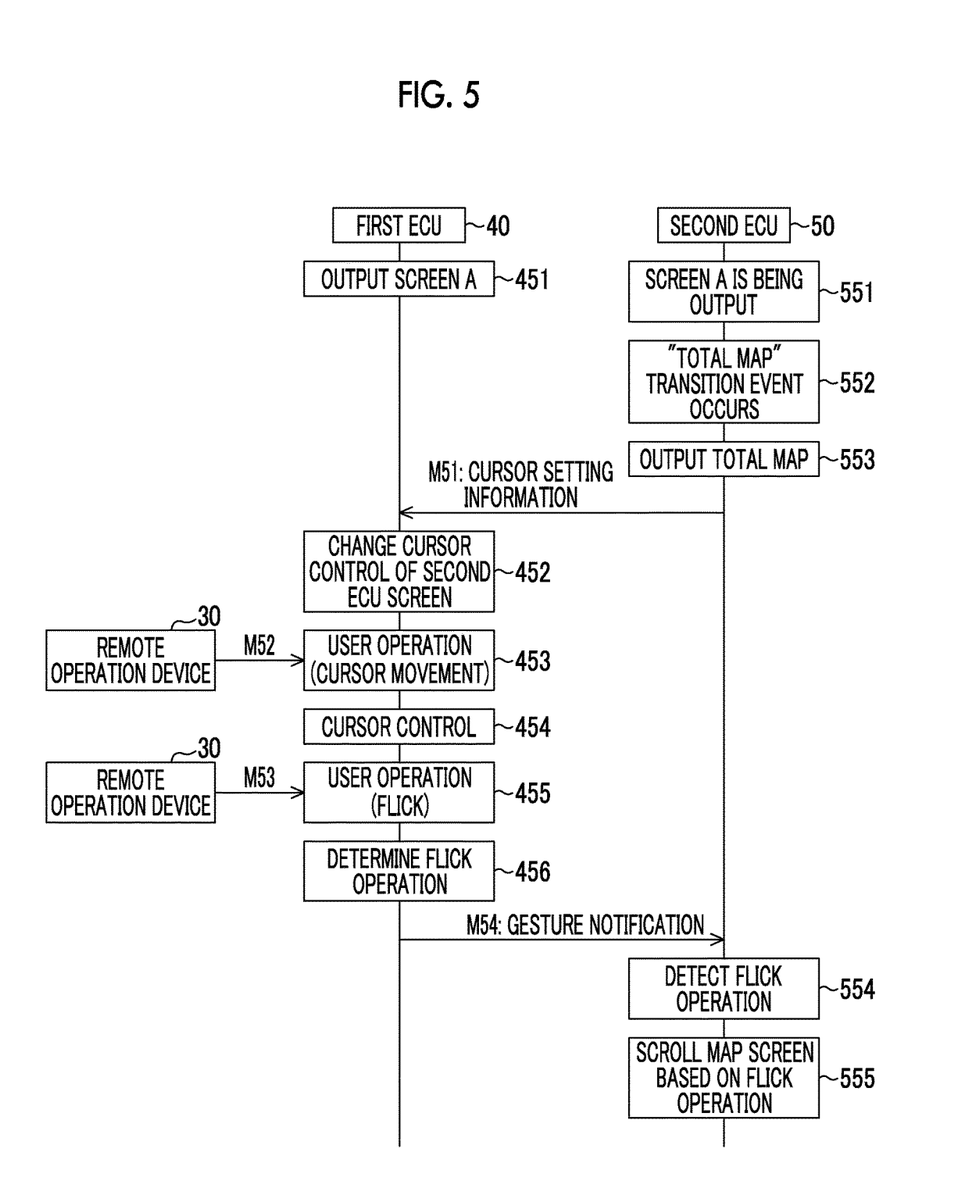
FIG. 5 is a sequence diagram showing an example of cursor control in another example.

As shown in FIG. 5, first, the first ECU 40 makes the "screen A" be displayed in a right portion in the display area of the display DP (Step 451). The second ECU 50 is outputting the "screen A" in a left portion in the display area of the display DP (Step 551). The "screen A" of the second ECU 50 is displayed on the display device 20 through the first ECU 40. Then, a transition event to "total map" to be a target of an operation occurs in the second ECU 50 (Step 552). The second ECU 50 outputs a "total map" with the occurrence of the event (Step 553). The "total map" is displayed on the display device 20 through the first ECU 40. The first ECU 40 stops the output of the "screen A" output from the first ECU 40 when the second ECU 50 makes the "total map" be displayed. The second ECU 50 gives notification M51 including cursor setting information on the "total map" output from the second ECU 50 to the first ECU 40. The cursor setting information that is notified to the first ECU 40 by the second ECU 50 is an example of second setting information.

The cursor setting information is the same as the above-described cursor setting information, and is information that sets how the cursor is displayed at each position or element on the screen and what kind of function the cursor exhibits. For example, the cursor setting information includes cursor classification, cursor display state, touch pad control form, SW information within the screen, and next SW information in the up, down, right, and left directions of the SW.

The first ECU 40 receives the notification M51 including the cursor setting information, and changes the cursor control to the area where the "total map" displayed by the second ECU 50 is displayed, in conformity with the notification M51 (Step 452).

Thereafter, operation information M52 is input from the remote operation device 30 to the first ECU 40, and the first ECU 40 detects that a user operation is cursor movement from the input operation information M52 (Step 453). The first ECU 40 changes cursor information that is transferred to the display device 20, based on information regarding the detected cursor movement to perform the cursor control (Step 454). With this, the position of the cursor that is displayed on the display device 20 is changed.

Subsequently, operation information M53 is input from the remote operation device 30 to the first ECU 40, and the first ECU 40 detects that a user operation is a "flick" from the input operation information (Step 455). That is, the type of operation is detected as the "flick". The first ECU 40 determines that a flick operation is performed on coordinates on the "total map" of the second ECU 50 from cursor coordinates when the flick is made (Step 456). At this time, the first ECU 40 detects the cursor coordinates in a coordinate system of the "total map". Then, the first ECU 40 gives gesture notification M54 including operation coordinates and the type of operation to the second ECU 50.

The second ECU 50 receives the gesture notification M54 and acquires the operation coordinates and the type of operation. With this, the second ECU 50 detects that the map is flicked (Step 554).

The second ECU 50 gives notification of the acquired operation coordinates and the flick operation to the program that manages screen display, thereby performing an operation to scroll the map screen corresponding to the flick operation (Step 555). With this, the user operation performed on the screen displayed by the second ECU 50 with the remote operation device 30 can be processed in the first ECU 40 and notified to the second ECU 50, and the second ECU 50 can perform appropriate processing on the notification.

As described above, with the display system according to the embodiment, the following effects are obtained.

(1) When the first ECU 40 is outputting the screen and when the second ECU 50 is outputting the screen, the first ECU 40 controls the display of the cursor based on the operation information and the setting information. For this reason, it is possible to suppress a sense of discomfort on the display of the cursor due to transition of an output source of a screen.

(2) Since the cursor setting information is notified to the first ECU 40 along with the screen output from the second ECU 50, it is possible to control the display of the cursor with the control form of the cursor suitable for the screen after change.

(3) The single screen that is displayed on the display device 20 is constituted of the screen output from the first ECU 40 and the screen output from the second ECU 50. In a situation in which the screens related to transition are displayed at a time, an event that the cursor is not displayed instantaneously, an event that a plurality of cursors is displayed instantaneously, or the like is likely to be visually recognized. With the above-described configuration, since a sense of discomfort due to such a situation is suppressed, the effect conforming to (1) described above is obtained more remarkably.

(4) The first ECU 40 collectively performs the control for cursor pull-in to the SW on each screen, the control for cursor movement across the screens, and the determination of the gesture on each screen. For this reason, in regards to cursor pull-in on each screen, display of the cursor across the screens, and change in the screen according to the gesture, it is possible to suppress a sense of discomfort given to the user.

(5) Detection of an operation, such as a tap, on the cursor to the SW or drawing of animation or the like according to the tap is performed by an ECU that outputs the operated SW. For this reason, it is possible to distribute a load for detection of an operation, such as a tap, or drawing, such as animation, to the first ECU 40 and the second ECU 50.

The above-described embodiment can be carried out in the following forms.

Screen

In the above-described embodiment, a configuration in which the second ECU 50 outputs the screen drawn by the second ECU 50 to the display device 20 through the first ECU 40 has been illustrated. The disclosure is not limited thereto, and the first ECU 40 and the second ECU 50 may directly output the screens drawn by the first ECU 40 and the second ECU 50 to the display device 20. That is, the screen output from the second ECU 50 is the screen drawn by the drawing unit 51 and output from the second ECU 50 to the display device 20. The screen output from the first ECU 40 is the screen drawn by the drawing unit 41 and transmitted from the first ECU 40 to the display device 20. At this time, the screens that are drawn by the drawing units 41, 51 are predetermined areas that are allocated in advance in the ECUs including the drawing units 41, 51.

The first ECU 40 may make the screen drawn by the drawing unit 41 be displayed in the entire display area of the display DP. Then, operation in which the screen displayed in the entire display area of the display DP changes from the screen output from the first ECU 40 to the screen output from the second ECU 50 is also possible in the above-described display system.

Operation Device

In the above-described embodiment, for the remote operation device 30, a device that inputs information based on an operation on the touch pad has been illustrated. The disclosure is not limited thereto, and the operation device may be changed to a device that inputs information based on an operation using a touch panel, a mouse, a line of sight, or the like.

At this time, the operation device can detect the same type of operation as the touch pad as the type of operation on the touch panel. The operation device can detect a click, a double-click, or a wheel operation as the type of mouse operation. The operation device can detect motion of eyes, blinking, or the number of blinks as the type of operation of the line of sight.

Others

The operation information that is input from the operation device to the first ECU 40 may be either of the operation position that is the position where the operation is performed or the type of operation.

In a case where how the cursor is displayed on the screen output from the second ECU 50 and what kind of function the cursor exhibits are set in advance, the first ECU 40 may store the cursor setting information in advance, and may omit the notification of the cursor setting information from the second ECU 50 to the first ECU 40.

In the above-described embodiment, a configuration in which the first ECU 40 transmits the screen information displayed on the display device 20 through the communication bus 10 has been illustrated. The disclosure is not limited thereto, and a configuration may be made in which the first ECU 40 or the second ECU 50 transmits the screen information to the display device 20 through a communication line or the like suitable for communication of the screen information other than the communication bus using the CAN protocol.

In the above-described embodiment, a configuration in which information of the cursor displayed on the display device 20 is included in the screen information and transmitted has been illustrated. The disclosure is not limited thereto, and may be changed to a configuration in which information of the cursor is transmitted to the display device separately from the screen information.

In the above-described embodiment, a case where the communication protocol is the CAN protocol has been described. The disclosure is not limited thereto, and as long as a message counter is used for securing reliability of a communication message, the communication protocol may be a protocol other than the CAN protocol, for example, a communication protocol, such as Ethernet (Registered Trademark) or FlexRay (Registered Trademark).

What is claimed is:

1. A display system comprising:
    a display device configured to display a single screen;
    an operation device configured to output operation information that is information relating to an operation of a cursor; and
    a plurality of electronic control units connected to a communication network, the electronic control units being configured to individually output screens that are displayed on the display device, the electronic control units including a first electronic control unit and a second electronic control unit, wherein
    the first electronic control unit is configured to use first setting information in which a control form of a cursor on a first screen output from the first electronic control unit is set and second setting information in which a control form of the cursor on a second screen output from the second electronic control unit is set, and
    the first electronic control unit is configured to control a display position of the cursor based on the operation information output from the operation device and the first setting information while the first electronic control unit is outputting the first screen, and the first electronic control unit is configured to control the display position of the cursor based on the operation information output from the operation device and the second setting information while the second electronic control unit is outputting the second screen, the first electronic control unit configured to control the display position of the cursor from the first screen across to the second screen, the first and second screens being adjacent to each other, the first setting information being information about how the cursor is displayed on each position of the first screen and what kinds of function the cursor exhibits, and the second setting information being information about how the cursor is displayed on each position of the second screen and what kinds of function the cursor exhibits, the second setting information notified by the second electronic control unit to the first electronic control unit,
    wherein the single screen to be displayed on the display device includes both of the first and the second screen.

2. The display system according to claim 1, wherein the second electronic control unit is configured to, with change in the screen output from the second electronic control unit, transmit information, in which a control form of the cursor on a screen after change is set, as the second setting information to the first electronic control unit, and the first electronic control unit is configured to control the display of the cursor using the second setting information received from the second electronic control unit.

3. The display system according to claim 1, wherein the second electronic control unit is configured to output the screen to the display device through the first electronic control unit, the first electronic control unit is configured to transmit a combined screen of the screen output from the second electronic control unit and the screen output from the first electronic control unit as the single screen to be displayed on the display device to the display device, and the first electronic control unit is configured to control the display of the cursor by specifying a relative position of the cursor with respect to the screen displayed on the display device based on the operation information and moving the cursor to the specified relative position.

4. The display system according to claim 3, wherein the first electronic control unit is configured to specify a type of operation based on the operation information and make the electronic control unit outputting the screen, on which the cursor is displayed, out of the first electronic control unit and the second electronic control unit execute display of the cursor corresponding to the specified type of operation.

5. The display system according to claim 4, wherein the operation device is a touch pad, and the type of operation includes a tap, a double-tap, a flick, pinch-in, and pinch-out.

6. The display system according to claim 4, wherein the operation device is a device that inputs information based on an operation using a touch panel, and the type of operation includes a tap and a flick.

7. The display system according to claim 4, wherein the operation device is a device that inputs information based on an operation using a mouse, and the type of operation includes a click, a double-click, and a wheel operation.

8. The display system according to claim 4, wherein the operation device is a device that inputs information based on an operation using a line of sight, and the type of operation includes motion of eyes, blinking, and the number of blinks.

* * * * *